United States Patent
Hatch et al.

(10) Patent No.: US 7,970,685 B2
(45) Date of Patent: Jun. 28, 2011

(54) SYSTEM AND METHOD FOR FINANCIAL PRODUCT MANAGEMENT

(75) Inventors: Jonathan D. Hatch, New Hartford, CT (US); George R. Jay, Burlington, CT (US); Mark M. Socha, Hartford, CT (US)

(73) Assignee: Hartford Fire Insurance Company, Hartford, CT (US)

(*) Notice: Subject to any disclaimer, the term of this patent is extended or adjusted under 35 U.S.C. 154(b) by 624 days.

(21) Appl. No.: 12/002,867

(22) Filed: Dec. 19, 2007

(65) Prior Publication Data

US 2008/0313096 A1    Dec. 18, 2008

(30) Foreign Application Priority Data

Jun. 13, 2007    (JP) .................................. 2007-156337

(51) Int. Cl.
*G06Q 40/00*    (2006.01)
(52) U.S. Cl. ............................. 705/36 R; 705/35; 705/37
(58) Field of Classification Search ................. 705/35, 705/36 R, 37
See application file for complete search history.

(56) References Cited

U.S. PATENT DOCUMENTS

| | | | |
|---|---|---|---|
| 6,278,983 | B1 | 8/2001 | Ball |
| 6,985,880 | B1 | 1/2006 | Hodgdon et al. |
| 7,136,833 | B1 | 11/2006 | Podsiadlo |
| 7,143,061 | B2 * | 11/2006 | Treynor ...................... 705/36 R |
| 7,480,634 | B1 | 1/2009 | Cornelius |
| 2003/0028456 | A1 | 2/2003 | Yolles |
| 2003/0055760 | A1 | 3/2003 | Kubo |
| 2003/0093348 | A1 * | 5/2003 | Finn ................................ 705/35 |
| 2003/0229561 | A1 | 12/2003 | Wallman |
| 2005/0154662 | A1 * | 7/2005 | Langenwalter ................ 705/35 |
| 2008/0071697 | A1 * | 3/2008 | Midlam et al. .............. 705/36 R |
| 2008/0071698 | A1 * | 3/2008 | Midlam et al. .............. 705/36 R |
| 2008/0215499 | A1 * | 9/2008 | O'Neill ....................... 705/36 R |

OTHER PUBLICATIONS

E(x)TRADE Canada Introduces High-Yield Cash Investment Account Canada NewsWire. Ottawa: Nov. 21, 2006. p. 1.*
Wall Street Cuts Yields On Investors' Cash; Firms Shift Money From Money-Market Funds to Lower-Paying Accounts; How to Switch Back Jane J. Kim. Wall Street Journal. (Eastern edition). New York, N.Y.: Aug. 31, 2005. p. D.1.*

* cited by examiner

*Primary Examiner* — Lalita M Hamilton
(74) *Attorney, Agent, or Firm* — Howard IP Law Group, PC (57) ABSTRACT

The present invention provides a financial product management system for managing a financial product, which makes it possible to attempt to reduce the investment risk associated with current price fluctuations even when making a lump-sum investment without requiring the investor or distributor to divide the total funds into smaller amounts.

23 Claims, 9 Drawing Sheets

SYSTEM AND METHOD FOR FINANCIAL PRODUCT MANAGEMENT

FIELD OF THE INVENTION

The present invention relates to a financial product management system, method, program, and a computer-readable recording medium for recording the financial product management program, for managing a pooled investment vehicle or other such financial product.

BACKGROUND OF THE INVENTION

When individuals want to manage their own funds, each individual will purchase and manage stocks and bonds based on his own judgment, in this case, investment risk is always high due to wide fluctuations in prices resulting from market forces.

Accordingly, for example, there are financial products such as "pooled investment vehicles". A "pooled investment vehicle" is a type of financial product similar to a "mutual fund" or a "collective investment vehicle." In a pooled investment vehicle funds are gathered together from a large number of customers, the large fund thus collected is managed in the form of assets such as stocks and bonds by an investment specialist, and the earnings therefrom are paid to the customers.

A "pooled investment vehicle" like this is a product, which an individual can buy at a small investment, and keep the risk of price fluctuations low by diversifying the investment of the collected fund into numerous assets such as stocks and bonds.

In addition, since a "pooled investment vehicle" is managed by a specialist instead of an individual using his own judgment to invest in assets such as stocks and bonds, it is an easy-to-use financial product that eliminates the need for the individual to acquire the knowledge and skills required to manage a fund.

In a "pooled investment vehicle" like this, the collected funds are diversified into assets such as U.S. stocks, U.S. bonds, foreign stocks, and foreign bonds but if the entire amount of the collected funds is diversified at the same time, there is no way to avoid the risk associated with current price fluctuations brought on by market influences at the time of investment.

Thus, a method for reducing current price fluctuation risk when diversifying the collected fund, as described above has been introduced.

One method for reducing price fluctuation risk is known as "dollar-cost averaging" technique. This technique attempts to reduce the risk of current price fluctuations by purchasing only a quantity of financial products capable of being bought with a fixed monthly amount of funds rather than purchasing the same quantity of financial products each month, making small purchases when current prices are high, and making large purchases when current prices are low.

However, this "dollar-cost averaging" is a system which calls for withdrawing a preset amount of money from a customer's deposit account periodically on a prescribed date (e.g. once each month for a specified number of months), and using this amount to purchase a targeted investment fund at the time of the withdrawal.

Thus, the investor or a financial product broker must make a series of periodic (e.g. monthly) purchases, creating an administrative problem for the investor or broker, and optimize the investment return on that portion of the investor's fund which the investor intends to invest during the program.

Thus, the problem is that when a customer desires to make a large investment, he must do so by dividing the investment into smaller amounts, making this approach too complex for practical application.

Another problem is that even a financial product broker, who handles a "pooled investment vehicle" like that described above, is compelled by "dollar-cost averaging" to manage the portion of the fund so as to maximize investment earnings via this technique.

Accordingly, an object of the present invention is to provide a financial product management system, a financial product management method, a financial product management program, and a computer-readable medium for storing the financial product management program for managing a financial product, which can attempt to reduce investment risks associated with current price fluctuations, even when carrying out a lump-sum investment without dividing funds into smaller amounts.

SUMMARY OF THE INVENTION

The above-mentioned deficiencies in previous systems are overcome by a financial product management system of the present invention. The financial product management system comprises a total investment funds data storage unit for registering data of the total investment funds invested in a financial product, and a specified rate earnings data processor for computing specified rate earnings data based on the above-mentioned total investment funds data and specified rate data.

Alternatively, the specified rate earnings data processor may be implemented as a specified rate earnings data processing module which is part of a single processor comprised of a plurality of processing modules for various computations. Likewise, any other processor mentioned herein may be combined along side other processors as a processing module into a single processor performing the operations described as being specific to each individual processing component.

Furthermore, the financial product management system comprises a specified rate earnings data storage unit for registering the above-mentioned specified rate earnings data, a split investments data processor for computing split investments data for splitting investments of the above-mentioned total investment funds data, and a split investments data storage unit for storing the above-mentioned split investments data.

According to the system described above, there is a total investment funds data storage unit for registering data on the total investment funds invested in a financial product, a specified rate earnings data processor for computing specified rate earnings data based on total investment funds data and specified rate data, and a specified rate earnings data storage unit for registering specified rate earnings data.

Thus, according to the present invention if a customer desires to make a large investment (e.g. $600,000), the entire investment can be invested without having to take the trouble of dividing and investing this in smaller amounts of $100,000 each. This is an easy-to-use method, because the portion of the investment amount (e.g. $600,000) which is not yet invested into the target funds can produce earnings at the specified rate of for example a 6% annual percentage rate (APR), thus in this example the earnings would be $36,000.

According to the example investment above, for total investment funds data, of $600,000, $36,000 is stored in the specified rate earnings data storage unit as specified rate earnings data. The amount of $36,000 is calculated by multiplying this total investment funds data by specified rate data, for example 6%.

Further, there is a split investments data processor for computing split investments data for splitting investments of total investment funds data, and a split investments data storage unit for storing split investments data. Therefore, in the above example, for the $600,000, current price fluctuation risk can be reduced because it is possible to carry out split investments in stocks and bonds by investing, for example, $100,000 per month over a six-month period.

Thus, the above-mentioned financial product management system makes it possible to reduce the investment risk associated with current price fluctuations, even when making a lump-sum investment without requiring the investor to divide the total funds into smaller amounts. Furthermore, the above described system is capable of managing a financial product that is very attractive to the customer. This is attractive because it adds a specified above-market earning for the portion of the total investment amount which is not yet invested into target funds.

In the preferred embodiment, the above-mentioned total investment funds data is asset data, the above-mentioned specified rate earnings data is liability data, and the financial product management system has a liability/asset conversion data processor, which computes liability/asset conversion data for incorporating a portion of the above-mentioned liability data into the total investment funds data.

According to one embodiment of the present invention, total investment funds data is asset data, the specified rate earnings data is liability data, and there is a liability/asset conversion data processor, which computes liability/asset conversion data for incorporating a portion of the liability data into the total investment funds data.

Since a portion of the specified rate earnings (e.g. $36,000), which is provided prior to splitting the total investment fund investment as described until now, is treated as liability/asset conversion data, and is gradually changed from liability data to asset data, the total investment funds data can sequentially increase this asset in a stable manner.

In one embodiment the present invention comprises a financial product management system, in which the total investment funds of the above mentioned total investment funds data are managed as a low-risk pooled investment vehicle, have investment profit data for this low-risk pooled investment vehicle, and the above-mentioned liability/asset conversion data processor at least creates the above-mentioned liability/asset conversion data by subtracting from the above-mentioned liability data the above-mentioned low-risk pooled investment vehicle investment profit data.

According to one embodiment of the present invention, the liability/asset conversion data processor creates the above-mentioned liability/asset conversion data by subtracting the above-mentioned low-risk pooled investment vehicle investment profit data from the liability data.

Therefore, it is possible to exclude excessive profits from being added to the total investment funds data by removing from the liability data an amount equivalent to the low-risk pooled investment vehicle investment profit data, which was already managed as a low-risk pooled investment vehicle in the liability/asset conversion data incorporated into the total investment funds data, which is asset data.

In the preferred embodiment, the financial product management system has a total liabilities repayment data storage unit for storing the above-mentioned liability data as total liabilities repayment data, and a split liabilities repayment data processor for computing split liabilities repayment data based on the above-mentioned total liabilities repayment data, and has a post-repayment data processor for changing at least a portion of the above-mentioned total liabilities repayment data into post-repayment data based on the above-mentioned split liabilities repayment data.

In one embodiment, the present invention may have a total liabilities repayment data storage unit for storing liability data as total liabilities repayment data, and a split liabilities repayment data processor for computing split liabilities repayment data based on total liabilities repayment data.

Thus, liability data may not remain solely as liability data, but rather this data is simultaneously treated as total liabilities repayment data, and becomes repayment data.

Subsequently, this total liabilities repayment data is divided into split liabilities repayment data by the split liabilities repayment data processor.

Further, since the embodiment described above has a post-repayment data processor for changing at least a portion of the total liabilities repayment data into post-repayment data based on the split liabilities repayment data, an amount of liability data equivalent to the above-mentioned split liabilities repayment data is gradually changed to post-repayment data, the above-mentioned total liabilities repayment data is gradually reduced, and finally ceases to exist. Thus, repayment processing can be carried out quickly and reliably.

In one embodiment the present invention comprises a financial product management method which further comprises a specified rate earnings data computation step in which a specified rate earnings data processor computes specified rate earnings data based on total investment funds data for investing in a financial product and specified rate data, and a specified rate earnings data storage step for storing the above-mentioned specified rate earnings data in a specified rate earnings data storage unit.

Furthermore, the financial product management method of the present invention comprises a split investments data processing step in which a split investments data processor computes split investments data for splitting the investments of the above-mentioned total investment funds data, and a split investments data storage step for storing the above-mentioned split investments data in a split investments data storage unit.

In one embodiment the present invention comprises a financial product management program, which further comprises a specified rate earnings data processing step in which a specified rate earnings data processor computes via a computer specified rate earnings data based on total investment funds data for investing in a financial product and specified rate data, and a specified rate earnings data storage step for storing the above-mentioned specified rate earnings data via a computer in a specified rate earnings data storage unit.

Furthermore, the financial product management program of the present invention comprises a split investments data processing step in which a split investments data processor computes via a computer split investments data for splitting the investments of the above-mentioned total investment funds data, and a split investments data storage step for storing the above-mentioned split investments data via a computer in a split investments data storage unit.

In another embodiment the present invention comprises a computer-readable recording medium on which a financial product management program is stored, which further comprises a specified rate earnings data processing step in which a specified rate earnings data processor computes via a computer specified rate earnings data based on total investment funds data for investing in a financial product and specified rate data, and a specified rate earnings data storage step for storing the above-mentioned specified rate earnings data via a computer in a specified rate earnings data storage unit.

Furthermore, the computer-readable recording medium on which a financial product management program is stored additionally comprises a split investments data processing step in which a split investments data processor computes via a computer split investments data for splitting the investments of the above-mentioned total investment funds data, and a split investments data storage step for storing the above-mentioned split investments data via a computer in a split investments data storage unit.

The present invention provides a financial product management system, a financial product management method, a financial product management program, and a computer-readable recording medium for recording the financial product management program for managing a financial product, which can attempt to reduce investment risks associated with current price fluctuations even when carrying out a lump-sum investment without dividing funds into smaller amounts.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION OF THE PREFERRED EMBODIMENT

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Moreover, well known methods, procedures, and substances for both carrying out the objectives of the present invention and illustrating the preferred embodiment are incorporated herein but have not been described in detail as not to unnecessarily obscure novel aspects of the present invention.

Various forms of computer readable media may be involved in carrying one or more sequences of one or more instructions to the processor (or any other processor of a device described herein) for execution. For example, the instructions may initially be stored on a magnetic disk of a remote computer. The remote computer can load the instructions into its dynamic memory and send the instructions over an Ethernet connection, cable line, or even telephone line using a modem. A communications device local to a computing device (or, e.g. a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 1:
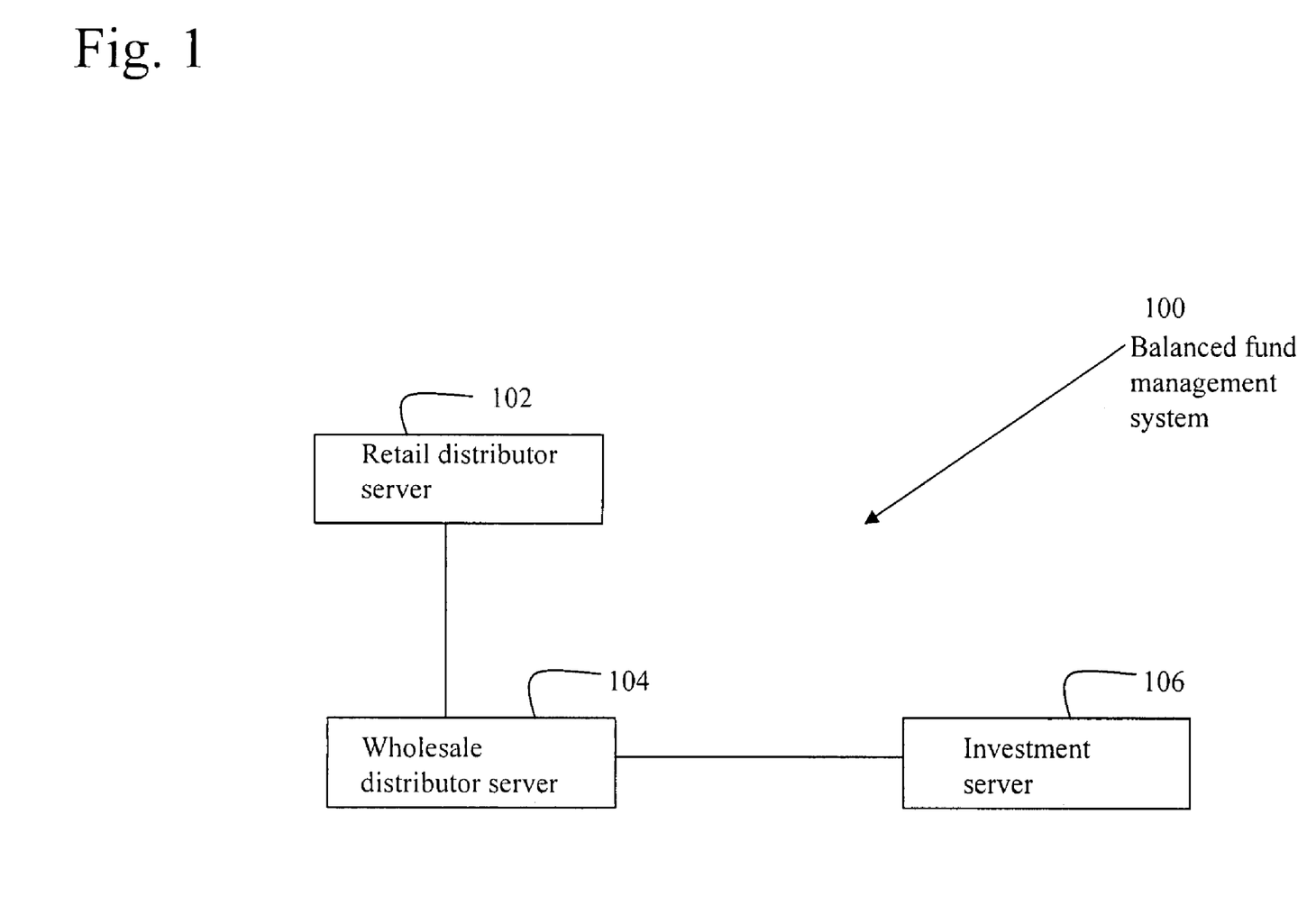
FIG. 1 is a diagram showing a balanced fund management system having an investment server, which, for example, is a financial product management system of the present invention for managing a financial product.

Further, the balanced fund management system 100 of FIG. 1 has a retail distributor server 102 and a wholesale distributor server 104, and, as shown in FIG. 1, an investment server 106 is connected to the wholesale distributor server 104. Investors may interact directly with the investment server 106, alternatively investors may go through either a retail distributor server 102 or a wholesale distributor server 104, or both. FIG. 1 depicts part of an embodiment of the financial product management system of the present invention for managing a financial product.

Figure 2:
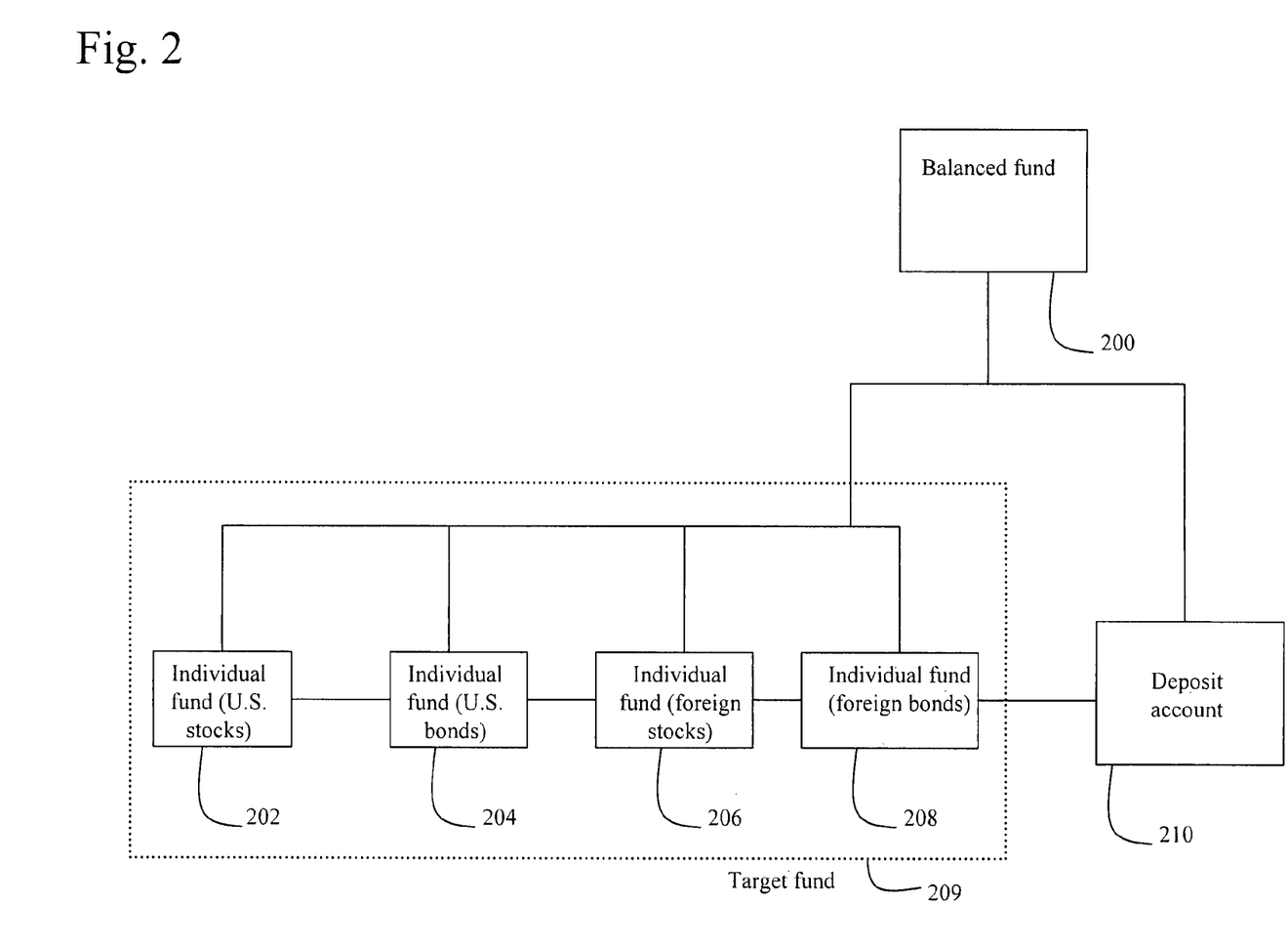
FIG. 2 is a diagram illustrating a balanced fund related to an aspect of the present invention.

For example, the financial product of the present invention may be implemented as a pooled investment vehicle product called a balanced fund 200. FIG. 2 depicts a balanced fund 200 related to an aspect of the present invention. As shown in FIG. 2, a balanced fund 200 is a fund that reinvests funds invested in the pertinent balanced fund into other pooled investment vehicles such as individual fund (e.g. U.S. stocks) 202, individual fund (e.g. U.S. bonds) 204, individual fund (e.g. foreign stocks) 206, and individual fund (e.g. foreign bonds) 208. Individual funds 202, 204, 206 and 208 are collectively known as the target funds. In an alternative embodiment, only some but not all of the individual funds comprise the target fund 210. Furthermore, any of the individual funds described above may be combined into a single fund without departing from the spirit of the present invention.

The balanced fund 200 of this embodiment, having individual funds (e.g. stocks) 202 and possibly other funds, into which reinvestments are made to earn investment profits, also comprises a deposit account 210, the main purpose of which is to deposit funds. This deposit account 210, as shown in FIG. 2, for example, could be a low-risk, and thus low-investment-profit money management fund ("MMF").

That is, investments invested in the balanced fund 200 are sent directly into the deposit account 210 of FIG. 2 one time, and then invested into an MMF from this account. In another embodiment, investments invested in the balanced fund 200 are sent directly into an MMF.

Next, the funds in the deposit account 210 are diversified into individual fund (e.g. stocks) 202 and so forth in FIG. 2. Details of these investments will be explained below.

Network servers may also be configured in a distributed architecture, wherein databases and processors are housed in separate units or locations. Some such servers (e.g. retail distributor server 102, wholesale distributor server 104, investment server 106, etc.) perform primary processing functions and contain at a minimum, RAM 304, ROM 306, and a controller 402 or CPU 302. In such an embodiment, each of these servers (e.g. retail distributor server 102, wholesale distributor server 104, investment server 106, etc.) is attached to a communications device 312 or port that serves as a primary communication link with other servers, client or user computers, and other related devices. The communications device 312 or port may have minimal processing capability itself, serving primarily as a communications router. A variety of communications protocols may be part of the system, including but not limited to: Ethernet, SAP, SAS™, ATP, Bluetooth, GSM and TCP/IP.

That is, a customer, who wishes to buy the balanced fund 200 shown in FIG. 2, submits an application to a distributor and provides the distributor with the investments, and this data is sent to the wholesale distributor server 104.

Buy data for the balanced fund 200 in question is sent from respective distributors to the wholesale distributor server 104 where it accumulates. Then, the total amount data of the accumulated funds becomes the investment fund data of the balanced fund 200, and is sent to the investment server 106. The investment server 106 is described below.

Furthermore, the retail distributor server 102, wholesale distributor server 104 and investment server 106 are operably connected as respectively described above, and more specifically, are connected via either a dedicated communication line or the Internet. Exchanges of information between any of the aforementioned servers may occur on a periodic basis. However, a real-time exchange of information may be implemented without departing from the spirit of the invention.

Next, the main hardware configuration of the investment server 106 of FIG. 1 will be explained below using FIG. 3.

Figure 3:
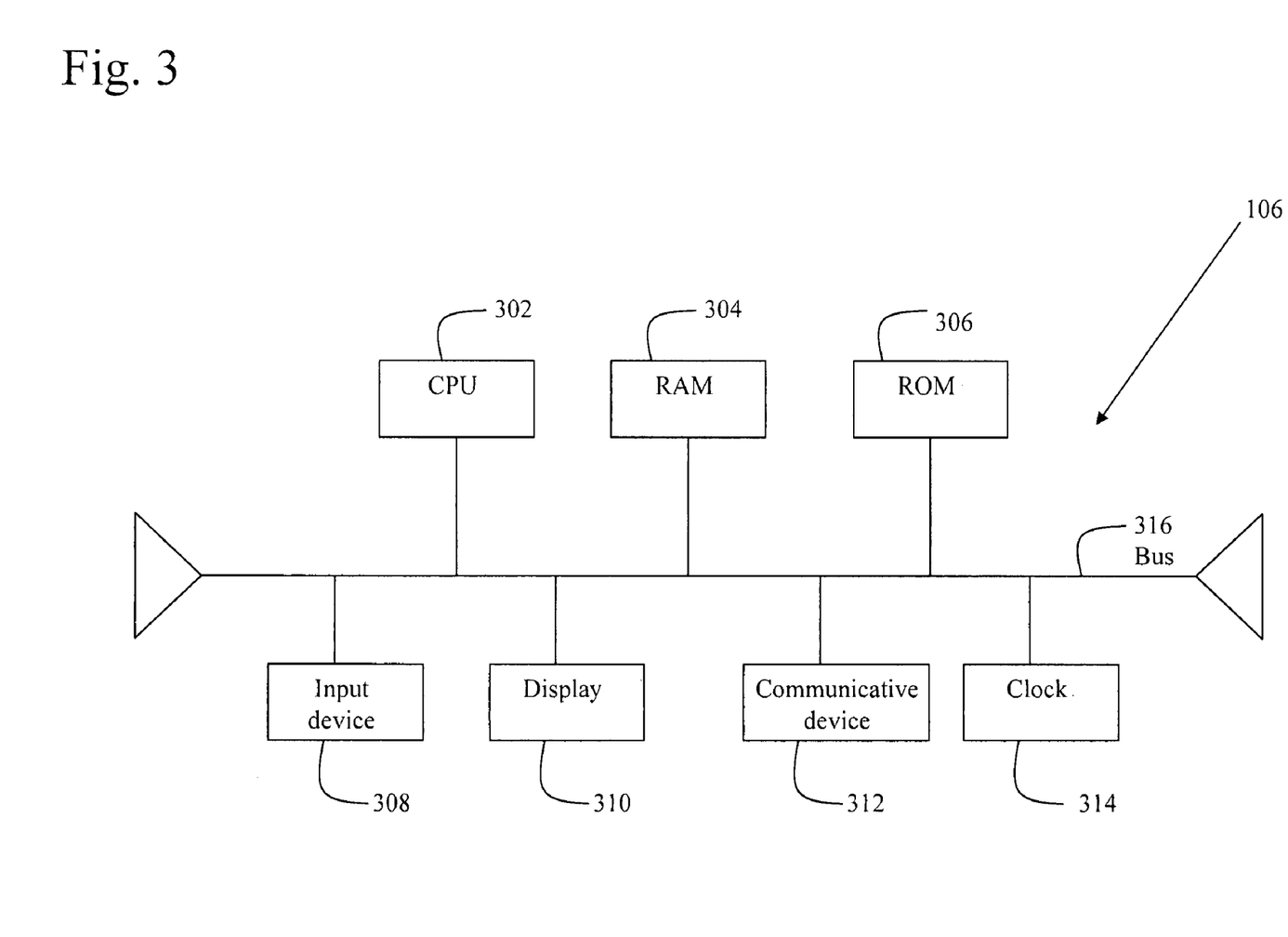
FIG. 3 is a diagram showing the principal hardware configuration of the investment server of FIG. 1.

The configuration shown in FIG. 3 is approximately the same for the retail distributor server 102 and wholesale distributor server 104 of FIG. 1.

First, as shown in FIG. 3, the investment server 106 comprises a computer, this computer has a bus 316, which connects a central processing unit ("CPU") 302, random access memory ("RAM") 304, and read-only memory ("ROM") 306.

The present invention relates to an improved financial product management system, apparatus and method, which includes at least one central processing computer or computer network server. Network server includes at least one controller 402 or CPU 302 ("central processing unit"), at least one communication port or hub, at least one RAM 304 ("random access memory"), at least one ROM 306 ("read-only memory") and one or more databases or data storage devices such as storage unit 409. All of these latter elements are in communication with the CPU 302 to facilitate the operation of the network server. The network server may be configured in many different ways. For example, the network server may be a conventional standalone server computer or alternatively, the function of a server may be distributed across multiple computing systems and architectures.

Further, the system comprises a keyboard or other such input device 308 for an investment server 106 user to input information related to an investment trust product or the like, a display 310, which is a display unit for displaying various information, a communication device 312, which is an information transmission unit for carrying out communications with the wholesale distributor server 104 of FIG. 1, are connected to the bus 316. A clock 314 is also connected to the bus 316.

The bus 316 has functions for connecting all of these devices, and is an internal path having address and data paths.

Servers of the present invention, such as wholesale distributor server 104, may also interact and/or control one or more user devices or terminals. The user device or terminal may include any one or a combination of the following, a personal computer, a mouse, a keyboard, a display 310, voice recognition software, or any other device generally represented by input/output devices such as input device 308 required to implement the above functionality. The program also may include program elements such as an operating system, a database management system and "device drivers" that allow the CPU 302 to interface with computer peripheral devices.

The CPU 302, in addition to processing a prescribed program, also controls the ROM 306 connected to the bus 316. The ROM 306 stores various programs and various types of information.

RAM 304 is capable of comparing and contrasting the contents of memory during the processing of a program, and for serving as a program execution area.

FIGS. 4 through 7 are diagrams showing the principal functions of the investment server 106.

Figure 4:
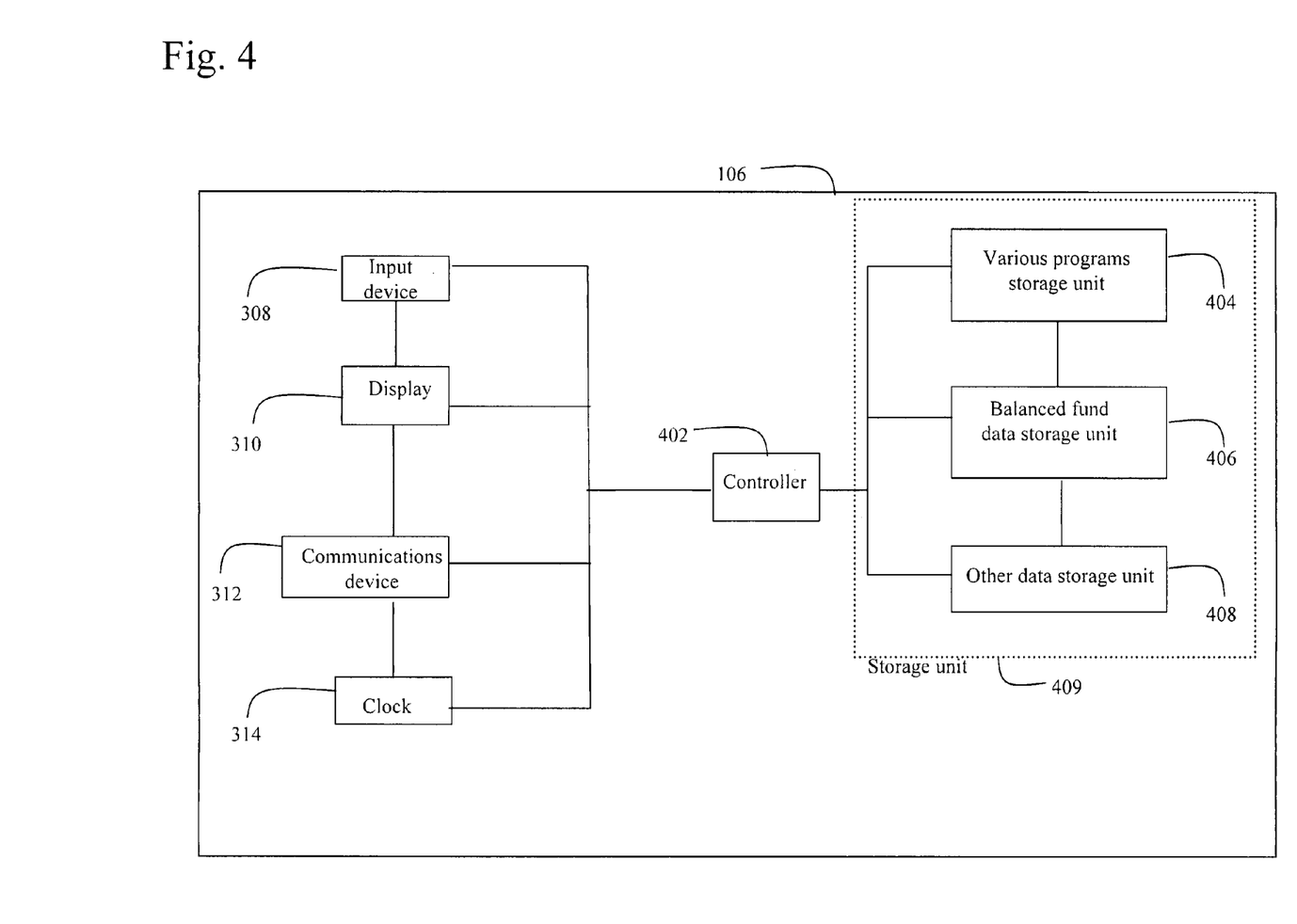
FIG. 4 is a diagram showing the main functional blocks of the investment server.

As shown in FIG. 4, the investment server 106 has a controller 402, the controller 402 processes various types of programs inside the various programs storage unit 404, and various types of data inside the balanced fund data storage unit 406 and other data storage unit 408 shown in FIG. 4.

The controller 402 comprises a processor, such as one or more conventional microprocessors and one or more supplementary co-processors such as math co-processors, or perhaps a CPU 302 type processor. The processor is in communication with a communication device 312 through which the processor communicates with other devices such as other servers, user terminals or devices. The communication device 312 may include multiple communication channels for simultaneous communication with, for example, other processors, servers or client terminals. As stated, devices in communication with each other need not be continually transmitting to each other. On the contrary, such devices may only transmit to each other as necessary, may actually refrain from exchanging data most of the time, and may require several steps to be performed to establish a communication link between the devices.

Further, in FIG. 4, the various programs storage unit 404, the balanced fund data storage unit 406 and the other data storage unit 408 may be parts of the same single storage unit 409, and are not necessarily independent. As depicted in FIG. 4 the aforementioned storage units or any combination of the storage units may be part of the same storage unit however this is not required. In an alternative embodiment these storage units may be entirely separate.

Suitable computer program code may be provided for performing numerous functions such as, computing specified rate earnings data based on total investment funds data for investing in a financial product and specified rate data, storing the specified rate earnings data, computing a split investments data for splitting investments of the total investment funds data, and storing the split investments data. The functions described above are merely exemplary and should not be considered exhaustive of the type of functions which may be performed by the computer program code of the present inventions.

The computer program code required to implement the above functions (and the other functions described herein) can be developed by a person of ordinary skill in the art, and is not described in detail herein.

Figure 5:
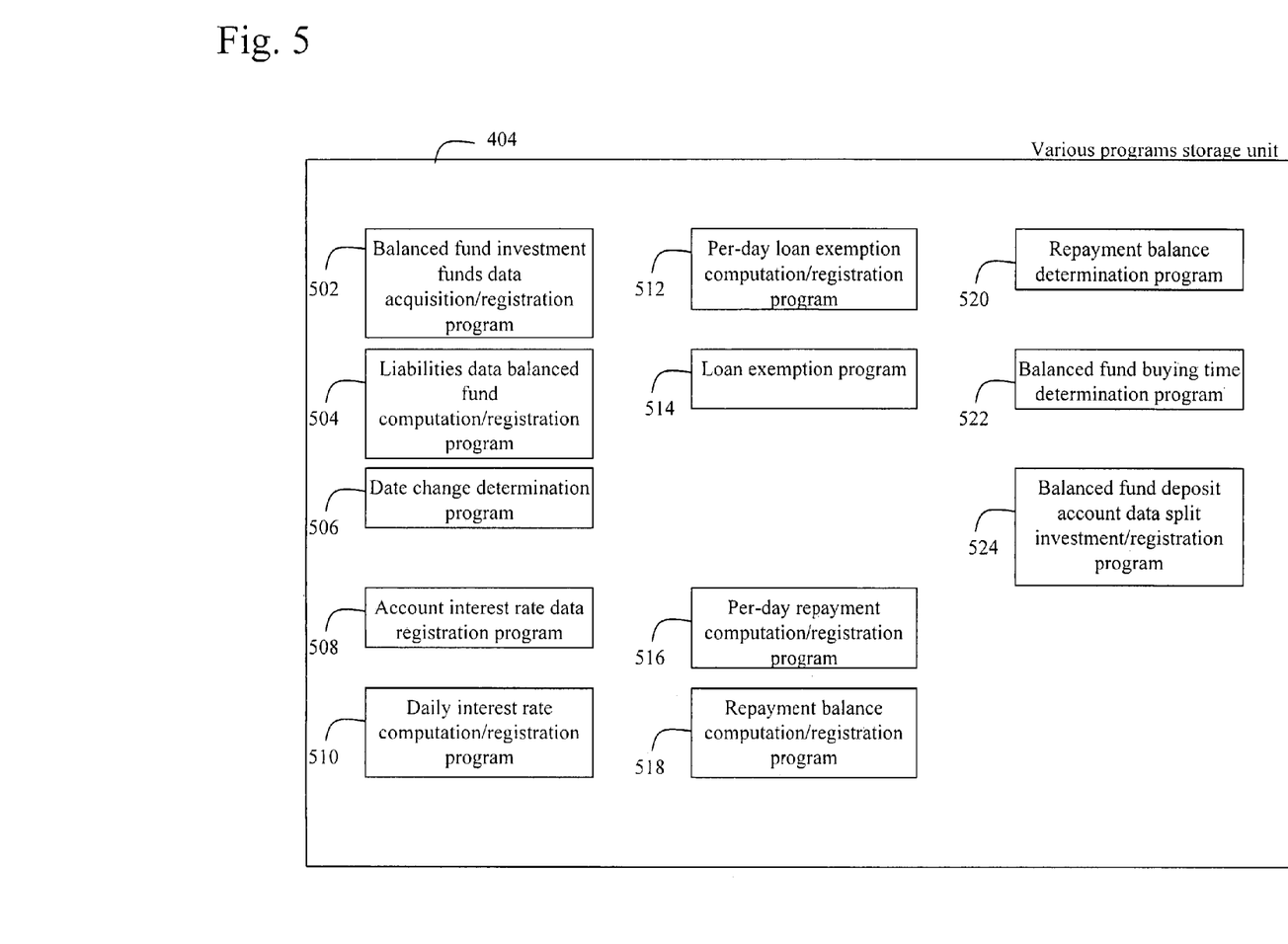
FIG. 5 is a diagram showing data inside the various programs storage unit in the investment server of FIG. 4.
Figure 6:
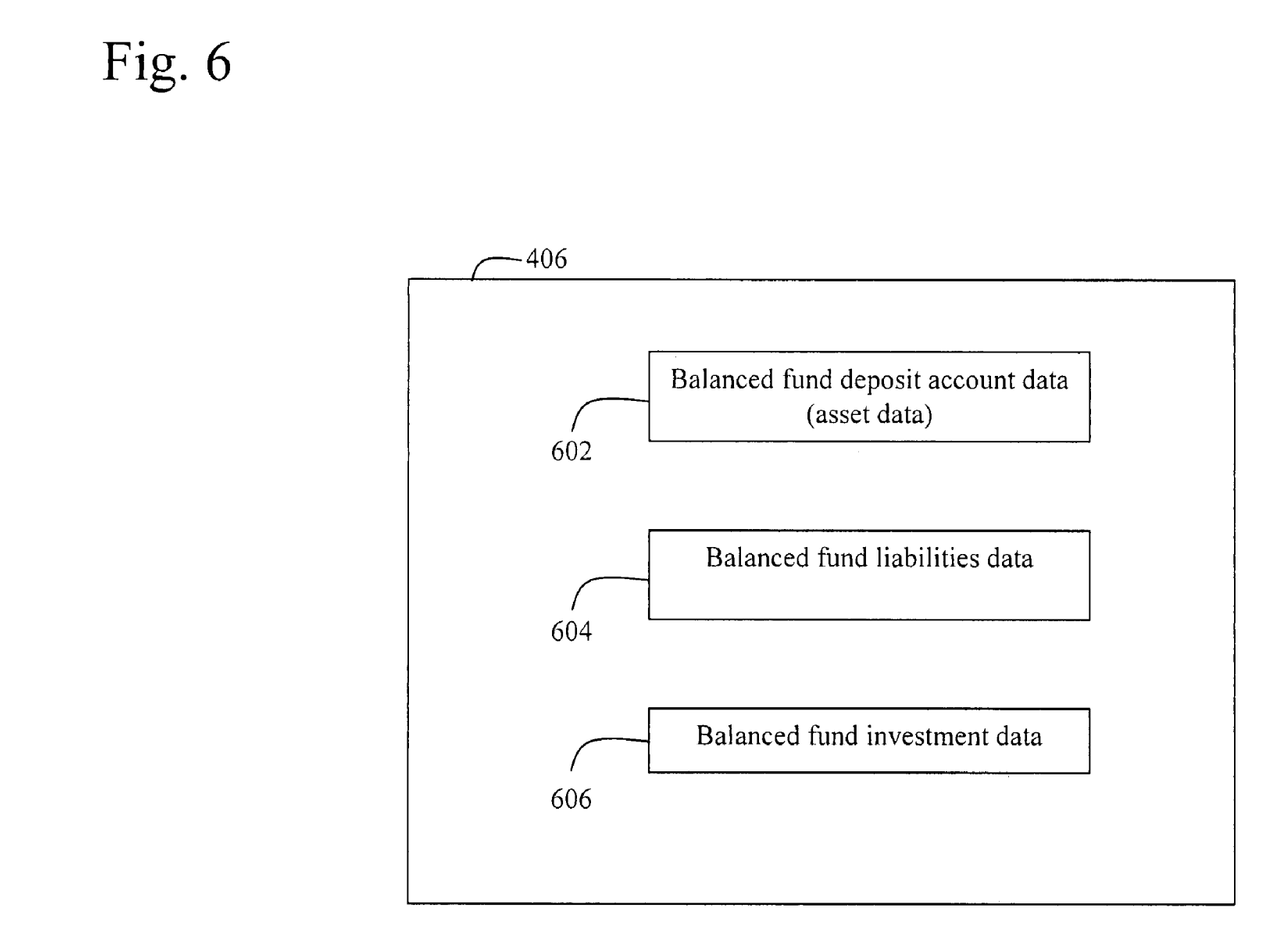
FIG. 6 is a diagram showing data inside a balanced fund data storage unit of the investment server of FIG. 4.
Figure 7:
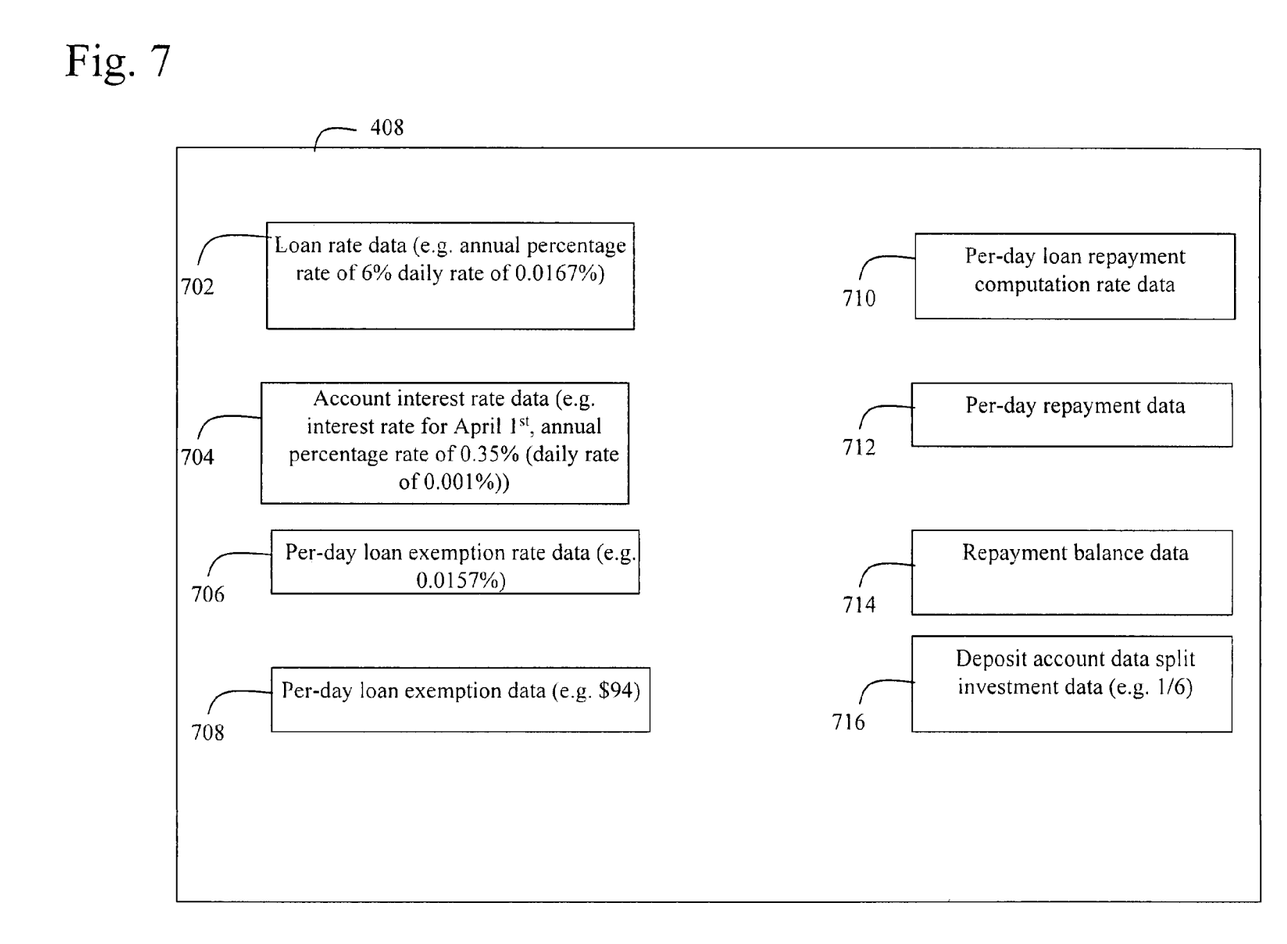
FIG. 7 is a diagram showing data inside the other data storage unit of the investment server of FIG. 4.

FIG. 5 depicts the data inside the various programs storage unit 404 of the investment server 106 of FIG. 4, FIG. 6 depicts the data inside the balanced fund data storage unit 406 of the investment server 106 of FIG. 4 and FIG. 7 depicts the data inside the other data storage unit 408 of the investment server 106 of FIG. 4.

The CPU 302 is in communication with the various programs storage unit 404. The various programs storage unit 404 may comprise an appropriate combination of magnetic, optical and/or semiconductor memory, and may include, for example, RAM 304, ROM 306, flash drive, an optical disc such as a compact disc and/or a hard disk or drive. The CPU 302 and the various programs storage unit 404 each may be, for example, located entirely within a single computer or other computing device; or connected to each other by a bus 316, communication medium, such as a USB port, serial port cable, a coaxial cable, an Ethernet type cable, a telephone line, a radio frequency transceiver or other similar wireless or wireline medium or combination of the foregoing.

The various programs storage unit 404 may store, (i) a program (e.g. computer program code and/or a computer program product) adapted to direct the CPU 302 in accordance with the present invention, and particularly in accordance with the processes described in detail hereinafter with regard to the controller 402; and (ii) a database such as storage unit 409 may be adapted to store information that may be utilized to store information required by a program. The storage unit 409, may include multiple records, each record includes fields that are specific to the present invention such as interest rates, funds, investors, investors' records of investment, variable annuity records, etc.

The program may be stored, for example, in a compressed, an uncompiled and/or an encrypted format, and may include computer program code. The instructions of the program may be read into a memory (i.e. RAM 304, ROM 306, etc,) of the processor from a computer-readable medium other than the data storage device, such as from a RAM 304 or ROM 306. While execution of sequences of instructions in the program causes the CPU 302 to perform the process steps described herein, hard-wired circuitry may be used in place of, or in combination with, software instructions for implementation of the processes of the present invention. Thus, embodiments of the present invention are not limited to any specific combination of hardware and software.

Figure 8A:
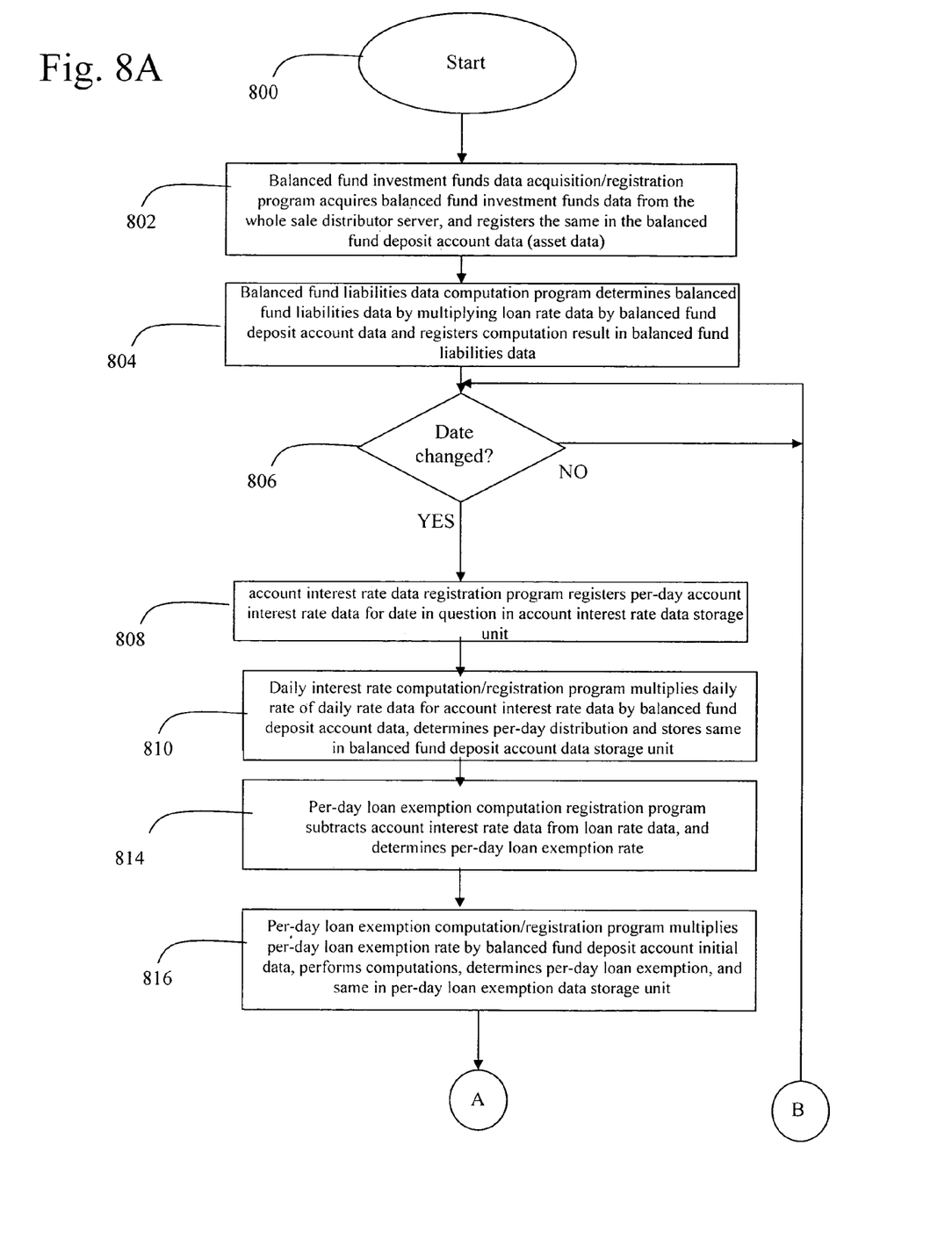
FIG. 8A is a flowchart showing the principal operations of the investment server of the balanced fund management system related to an aspect of the present invention.
Figure 8B:
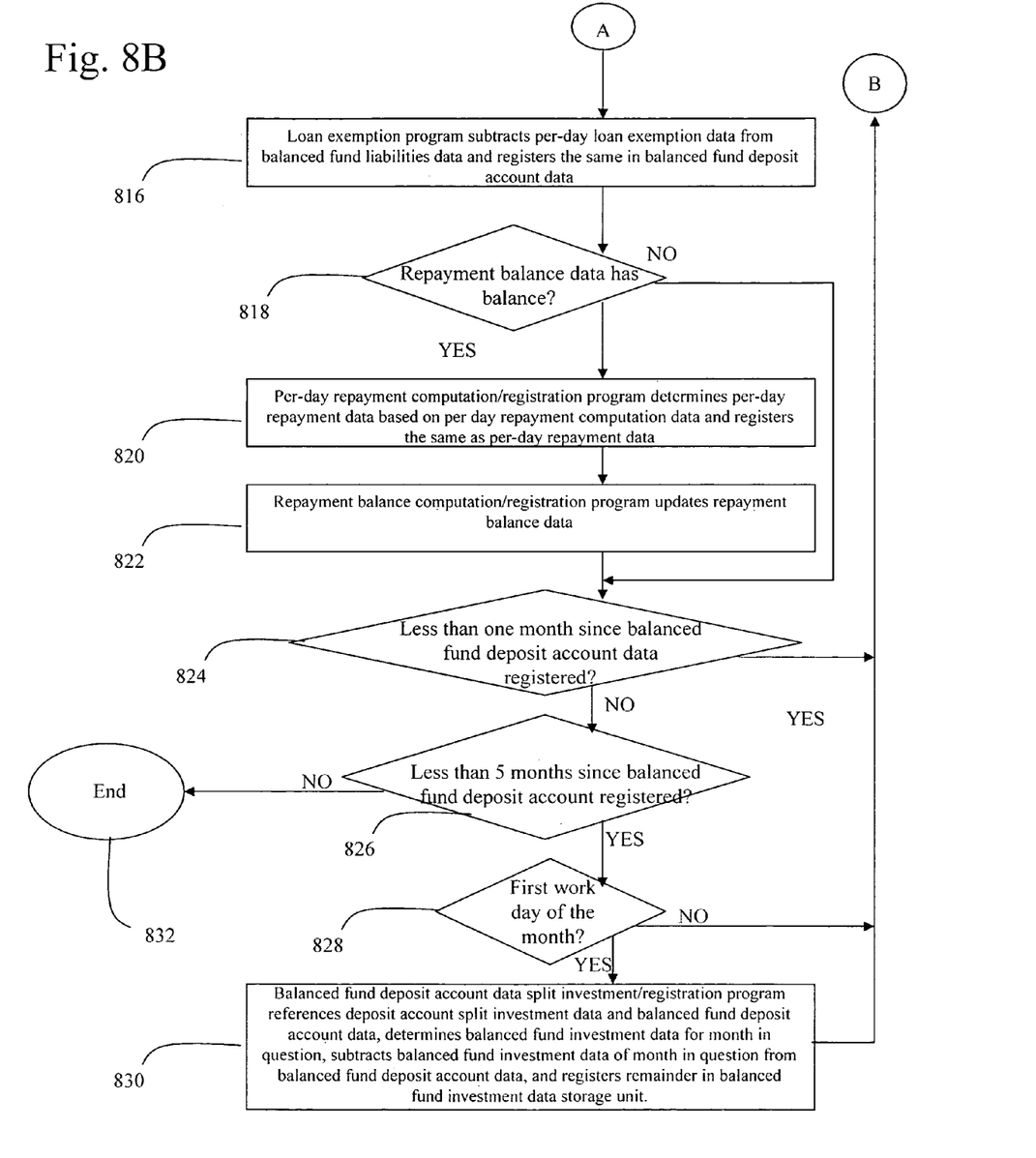
FIG. 8B is a flowchart showing the principal operations of the investment server of the balanced fund management system related to an aspect of the present invention.

FIGS. 8A and 8B are flowcharts showing the principal operations of the investment server 106 of the balanced fund management system 100 related to an aspect of the present invention.

Generally, the investment server 106, manages the managed product "balanced fund 200," which is a pooled investment vehicle, this is depicted in FIGS. 8A and 8B, and described below. This description concentrates on the various programs storage unit 404, the balanced fund data storage unit 406 and the other data storage unit 408 of the investment server 106 of FIGS. 4 through 7.

In one embodiment of the present invention, a customer buys the "balanced fund 200" shown in FIG. 2 at the distributor, which manages the retail distributor server 102 shown in FIG. 1. Next, these investments are sent to the investment server 106 via the wholesale distributor server 104 of a wholesale distributor.

Then, the procedure of FIG. 8A starts in step 800, next step 802 is performed. Specifically, the balanced fund investment funds data acquisition/registration program 502 of FIG. 5 runs. The program 502 acquires the balanced fund investment funds data of the balanced fund 200 sent from the wholesale distributor server 104, and registers it in the balanced fund deposit account data 602 of FIG. 6.

That is, data on the investments paid into the deposit account 210 of FIG. 2 is stored in the balanced fund deposit account data 602. In this embodiment, for illustrative purposes, it is assumed hereinafter that this data is $600,000. However, the amount of $600,000 is used here in as an example for illustrative purposes only and does not serve to limit the invention, as the present invention may be applied to a wide variety of dollar amounts.

Furthermore, this balanced fund deposit account data 602 is an example of total investment funds data.

For example, the $600,000 of the deposit account 210 of FIG. 2, which is the actual investments of this balanced fund deposit account data 602, is not directly invested in individual fund (e.g. stocks) 202, individual fund (e.g. bonds) 204 and so forth of FIG. 2, but rather is placed as-is into the deposit account 210.

Next, step 804 of FIG. 8A is performed. In step 804, a balanced fund liabilities data computation/registration program 504 runs. The program 504 acquires the loan rate data 702 of FIG. 7, for example, an APR of 6%, and multiplies same by the balanced fund deposit account data 602 of FIG. 6, for example, $600,000, to determine balanced fund liabilities data 604 (e.g. $36,000). This data is stored as the balanced fund liabilities data 604 of FIG. 6.

Furthermore, balanced fund liabilities data 604 is a type of specified rate earnings data, and the balanced fund liabilities data computation/registration program 504 is an example of the specified rate earnings data processor.

Thus, in step 804, an amount equivalent to a special interest rate (e.g. 6%) for a monetary amount, which has been paid into the deposit account 210 of FIG. 2, is stored in the balanced fund data storage unit 406 of FIG. 6 as liability data.

In other words, in step 804, both balanced fund deposit account data 602 (e.g. $600,000), which is asset data, and balanced fund liabilities data 604 (e.g. $36,000), which is liability data, are stored in the balanced fund data storage unit 406 of FIG. 6.

Accordingly, the procedure for converting this balanced fund liabilities data 604 (e.g. $36,000) to an asset, and adding same to the balanced fund deposit account data 602 is carried out as described below.

Next step 806 is performed. In step 806, the date change determination program 506 of FIG. 5 runs, and based on the clock 314 of FIG. 4 determines whether or not the date has changed. When it is determined that the date has changed, step 808 is performed.

In step 808, the account interest rate data registration program 508 of FIG. 5 runs, and registers the per-day account interest rate data for the date in question in the account interest rate data 704 of FIG. 7. In this example, the daily rate is 0.001%.

This is a step for investing the investments of the deposit account 210 of FIG. 2 in an MMF, which is a low-risk pooled investment vehicle, and for reflecting this data in the investment server 106 based on the daily distribution of these investment results.

Next, step 810 is performed. In step 810, the daily interest rate computation/registration program 510 of FIG. 5 runs, multiplies the balanced fund data 602 of FIG. 6 (e.g. $600,000) by the account interest rate data 704 of FIG. 7 (e.g. the daily interest rate of 0.001%), finds the per-day allotment (e.g., $6), and registers the same by adding it to the balanced fund data 602 (e.g. $600,006).

This takes the form of reflecting a state in which MMF dividends of the deposit account 210 of FIG. 2 are added to the deposited funds, causing the asset data to increase.

Next, step 812 is performed. In step 812, the per-day loan exemption computation/registration program 512 of FIG. 5 runs, subtracts account interest rate data 704 (e.g. daily rate of 0.001%) from the loan rate data 702 of FIG. 7 (e.g. daily rate of 0.0167%), determines the per-day loan exemption rate (e.g. daily rate of 0.0157%), and registers same in the per-day loan exemption rate data 706 of FIG. 7.

Thus, loan exemption rate data 706 is the remainder of subtracting the account interest rate data 704 from the loan rate data 702 as described hereinabove. The per-day loan exemption data 708 is equivalent to the product of the contents of deposit account 210 and loan exemption rate data 706. That is, loan exemption rate data 706 is a ratio showing the per-day monetary amount, which exempts the liabilities of the balanced liabilities data 604 of FIG. 6, and recombines (converts) same into the balanced deposit account 602.

In other words, this example does not recombine the balanced fund liabilities data 604 of FIG. 6 as-is into asset data like the balanced fund deposit account data 602, but rather removes the dividend, which was already added to the balanced fund deposit account data 602, and recombines the remainder from a liability to an asset.

Therefore, as seen in the above example the present invention prevents a larger than necessary asset from being recombined in the balanced fund deposit account data 602 of FIG. 6.

Further, the account interest rate data 704 is an example of pooled investment vehicle investment profit data, the loan rate data 702 is an example of specified rate data. In one embodiment the account interest rate data 704 may be rate data. In another embodiment interest rate data 704 may be amount data. Any data described herein as rate data may also be amount data and conversely any amount data described herein may be rate data without departing from the spirit of the present invention.

Further, per-day loan exemption data 708 is an example of liability/asset conversion data.

Subsequently, step 814 is performed. Step 814 is a step which treats the per-day loan exemption rate determined in 812 as the actual monetary amount. That is, the per-day loan exemption computation/registration program 512 of FIG. 5 runs, and by multiplying the per-day loan exemption rate data 706 of FIG. 7, (e.g. 0.0157%), by the initial data of deposit account 210 (which in this example, is $600,000), determines the per-day loan exemption data 708, (e.g. $94), and registers same in the per-day loan exemption data 708 of FIG. 7.

This step determines the per-day loan exemption monetary amount, which is recombined from the balanced fund liability data 604 of FIG. 6 to the balanced fund deposit account data 602, in other words, is changed from a liability to an asset.

Next, step 816 is performed. In step 816, a loan exemption program 514 runs, acquires the per-day loan exemption data 708 of FIG. 7, (e.g. $94), subtracts $94 from the balanced fund liabilities data 604 of FIG. 6, and adds $94 to the balanced fund deposit account data 602.

Consequently, the $94 in the above example, which was the liability data, is recombined into asset data, and assets are increased.

Thus, in this example, it is illustrated that once money is paid into the deposit account 210 of FIG. 2, a special interest rate profit of 6% is applied to the total amount of this paid in money, but not all of this is converted to assets from the outset, rather, this profit is initially treated as liability data, and then the assets gradually increase everyday (in this example, in $94 increments).

This makes it possible to curb a sudden increase in assets.

Conversely, a customer who buys the balanced fund 200 of FIG. 2 can earn the special interest rate (e.g. 6%), prior to actually investing in target funds (e.g. stocks) 202 and so forth of FIG. 2, making for an easy-to-use pooled investment vehicle product, which, unlike the small investments of conventional "dollar-cost averaging", is advantageous for investing a large sum.

Next, step 818 is performed. In step 818, the repayment balance determination program 520 of FIG. 5 runs, references the repayment balance data 714 of FIG. 7, and determines whether or not there is a repayment balance.

Repayment balance data 714 is the initial data of the balanced funds liability data 604 of FIG. 6, and in this aspect embodiment, for example, is $36,000.

Thus, the repayment balance data 714 is an example of repayment liability data.

When there is a repayment balance in step 818, step 820 is performed. In step 820, the per-day repayment computation/registration program 516 of FIG. 5 runs, and determines the per-day repayment data 712 based on the per-day repayment computation rate data 710.

Processing moves to 822 next. In step 822, the repayment balance computation/registration program 518 of FIG. 5 runs, and subtracts the per-day repayment data 712 from the repayment balance data 714.

Consequently, repayment processing can be carried out quickly and reliably, and the per-day repayment can be kept low, making repayment reasonable.

Further, the repayment balance computation/registration program 518 is an example of a post-repayment data processor.

Furthermore, when it is determined in step 818 that no balance exists in the repayment balance data 714, repayment processing ends.

Next, step 824 is performed. Step 824 and beyond constitute steps for diversifying, for example, $600,000, which is the amount in the deposit account 210 of FIG. 2, and the amount of the balanced fund deposit account data 602 of FIG. 6, via investments in target funds (e.g. stocks) 202 and so forth of FIG. 2 in monthly or other periodic increments, for example, of $100,000 each. Consequently, it becomes possible to attempt to reduce the price fluctuation risk associated with a lump-sum investment of $600,000. This will be explained more specifically below.

In step 824, the balanced fund buying time determination program 522 of FIG. 5 runs, determines whether or not it has been less than a month since the balanced funds deposit account data 602 of FIG. 6 was input, and when it is under a month, determines that it has been one month, and proceeds to step 826.

In step 826, the balanced fund buying time determination program 522 of FIG. 5 determines if it has been less than five months since the balanced fund deposit account data 602 of FIG. 6 was input, and when it has been less than five months, proceeds to step 828, and in step 828, determines whether or not it is the first working day of the month, and when it is the first working day of the month, splits the monetary amount of the balanced fund deposit account data 602, and prompts investment in target funds (e.g. stocks) 202 and so forth of FIG. 2 (830), the procedure then ends in step 832.

In other words, in step 830, the balanced fund deposit account data split investment/registration program 524 of FIG. 5 runs, references the balanced fund deposit account data 602 of FIG. 6 (e.g. $600,000) and the deposit account data split investment data 716 of FIG. 7 (e.g. ⅙), makes $100,000, which is ⅙$^{th}$ of $600,000, the balanced fund investment amount for the month in question, and stores this amount as the balanced fund investment data 606 of FIG. 6 for the month in question (examples of the split investment data processing step and the split investment data storage step).

A process for subtracting this $100,000 from the balanced fund deposit account data 602 is carried out at this time.

By so doing, the $100,000 in the above example is stored in the balanced fund investment data 606 of FIG. 6 each month for six months. Therefore, the person in charge of investing in target funds (e.g. stocks) 202 of FIG. 2 can attempt to reduce the risk associated with the fluctuating price of a fund targeted for investment by investing the pertinent monetary amount in accordance with this balanced fund investment data 606.

Further, managing balances also becomes easier when investments are split on a monthly basis.

A balanced fund deposit account data split investment/registration program 524 like this is an example of a split investment data processor, and the balanced fund investment data 606 is an example of split investment data.

As described above, this aspect of the embodiment comprises a balanced fund management system 100, which makes it possible to attempt to reduce the investment risk associated with current price fluctuations even when a customer makes a lump-sum investment without requiring the investor or distributor to divide the total funds into smaller amounts, and which is capable of managing a financial product that adds a specified earning for the total investment amount, making it very attractive to the customer.

A financial product management program can be used to execute on a computer the examples of operations described hereinabove, such as the specified rate earnings data processing step, the specified rate earnings data storage step, the split investments data processing step, and the split investments data storage step.

Further, a computer-readable recording medium, which records a financial product management program such as this can also be used.

The program storage medium, which is utilized to install the financial product management/program and so forth in a computer, and to make it executable by the computer, for example, can be realized not only by packaged media such as a flexible disk like the floppy (registered trademark), CD-ROM (Compact Disc Read Only Memory), CD-R (Compact Disc-Recordable), CD-RW (Compact Disc-Rewritable), DVD (Digital Versatile Disc), but also by a semiconductor memory, magnetic disk or magneto-optical disc on which the program is either temporarily or permanently stored.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

While the present invention has been described with reference to the preferred embodiment and alternative embodiments, which have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed:

1. A system for management of a financial product having total investment funds data, specified rate earnings data, and split investments data, said system comprising:
  a processor comprising a specified rate earnings data processing module for computing the specified rate earnings data based on total investment funds data and specified rate data, and a split investments data processing module for computing split investments data for splitting investments of said total investment funds data for automatically investing predetermined portions of the total investment funds at predetermined intervals in one or more target funds; and
  a storage unit for registering said specified rate earnings data, registering data on the total investment funds invested in a financial product, and storing said split investments data.

2. The financial product management system of claim 1 wherein said processor further comprises:
  a liability/asset conversion data processing module which computes liability/asset conversion data for incorporating a portion of liability data into said total investment funds data;
  wherein said total investment funds data is asset data; and
  wherein said specified rate earnings data is liability data.

3. The financial product management system of claim 2, wherein:
  said total investment funds of said total investment funds data have investment profit data; and
  said liability/asset conversion data processing module creates at least the liability/asset conversion data by subtracting the investment profit data from the liability data.

4. The financial product management system of claim 3 wherein said storage unit stores the liability data as total liabilities repayment data; and
  wherein said processor further comprises a split liabilities repayment data processing module for processing split liabilities repayment data based on said total liabilities repayment data, and a post-repayment data processing module for changing at least a portion of said total liabilities repayment data into post-repayment data based on said split liabilities repayment data.

5. A system for management of a financial product having total investment funds data storage unit and a specified rate earnings data processor, said system comprising:

a data storage unit for registering data on total investment funds invested in a financial product; and a processor comprising a specified rate earnings data processing module for computing specified rate earnings data based on total investment funds data and specified rate data and a split investments data processing module for computing split investments data for splitting investments of said total investment funds data, and for automatically investing predetermined portions of the total investment funds at predetermined intervals in one or more target funds.

6. The financial product management system of claim 5 wherein said storage unit further registers said specified rate earnings data.

7. The financial product management system of claim 5 wherein said storage unit further stores said split investments data.

8. The financial product management system of claim 7 and further:
wherein said processor further comprises a liability/asset conversion data processing module which computes liability/asset conversion data for incorporating a portion of liability data into said total investment funds data;
wherein said total investment funds data is asset data; and
wherein said specified rate earnings data is liability data.

9. The financial product management system of claim 8 wherein said total investment funds of said total investment funds data are managed as an investment vehicle.

10. The financial product management system of claim 9 wherein said total investment funds of said total investment funds data have investment profit data for said investment vehicle.

11. The financial product management system of claim 10 wherein said processor further creates at least said liability/asset conversion data.

12. The financial product management system of claim 11 wherein said liability/asset conversion data is calculated by subtracting the investment vehicle investment profit data from the liability data.

13. The financial product management system of claim 12 wherein said storage unit further stores said liability data as total liabilities repayment data.

14. The financial product management system of claim 13 wherein said processor further comprises a split liabilities repayment data processing module for processing split liabilities repayment data based on said total liabilities repayment data.

15. The financial product management system of claim 14 wherein said processor further comprises a post-repayment data processing module for changing at least a portion of said total liabilities repayment data into post-repayment data based on said split liabilities repayment data.

16. A computer implemented method for financial product management the financial product having earnings data, specified rate earnings data, and split investments data, the method comprising:
computing specified rate earnings data based on total investment funds data for investing in a financial product and specified rate data by a processor;
computing a split investments data for splitting investments of the total investment funds data by the processor for automatically investing predetermined portions of the total investment funds at predetermined intervals in one or more target funds;
storing the specified rate earnings data in a storage unit; and
storing the split investments data in the storage unit.

17. The computer implemented financial product management method of claim 16 and further:
wherein the storage unit further stores liability data, wherein the liability data is stored as total liabilities repayment data; and
wherein the processor further processors split liabilities repayment data based on the total liabilities repayment data.

18. The computer implemented financial product management method of claim 17 wherein the processor further changes at least a portion of the total liabilities repayment data into post-repayment data based on the split liabilities repayment data.

19. A tangible computer-readable medium for management of a financial product having specified rate earnings data, and split investment data, the computer-readable medium having a plurality of instructions thereon, the instructions, when executed by a processor, causing the processor to:
compute a computer specified rate earnings data based on total investment funds data for investing in a financial product and specified rate data;
store the specified rate earnings data in the storage unit; and
compute split investments data for splitting investments of the total investment funds data for automatically investing predetermined portions of the total investment funds at predetermined intervals in one or more target funds.

20. The tangible computer-readable medium of claim 19 wherein the instructions, when executed by the processor, further cause the processor to store the split investments data in the storage unit.

21. A computer-readable recording medium on which a financial product management program is stored, the financial product having specified rate earnings data, and split investment data, the financial product management program comprising:
a specified rate earnings data processing instruction causing a processor to compute specified rate earnings data based on total investment funds data for investing in a financial product and specified rate data;
a split investments data processing instruction causing the processor to compute split investments data for splitting investments of the total investment funds data for automatically investing predetermined portions of the total investment funds at predetermined intervals in one or more target funds;
a specified rate earnings data storage instruction causing the specified rate earnings data to be stored in a storage unit; and
a split investments data storage instruction causing the split investments data to be stored in the storage unit.

22. The financial product management program of claim 21 wherein the data stored in the storage unit is stored in a plurality of storage units.

23. The financial product management program of claim 21 wherein the data computed by the processor is computed by a plurality of processors.

* * * * *